United States Patent [19]

Schiller et al.

[11] Patent Number: 5,035,205
[45] Date of Patent: Jul. 30, 1991

[54] COLLAPSIBLE DISPOSABLE CAT LITTER BOX

[76] Inventors: Philip Schiller, 256 Pepper Rd., Huntingdon Valley, Pa. 19006; Michael Brick, 5 Lawrence St., Bloomfield, N.J. 07003

[21] Appl. No.: 484,155
[22] Filed: Feb. 23, 1990
[51] Int. Cl.⁵ ............................................. A01K 29/00
[52] U.S. Cl. ...................................... 119/168; 119/165
[58] Field of Search ............................. 119/1, 168, 165

[56] References Cited

U.S. PATENT DOCUMENTS

| | | | |
|---|---|---|---|
| 3,581,977 | 6/1971 | Kirsky et al. | 119/1 |
| 4,014,292 | 3/1977 | Coughlin | 119/1 |
| 4,305,544 | 12/1981 | Noonan | 119/1 |
| 4,548,160 | 10/1985 | Feitelson | 119/1 |
| 4,763,603 | 8/1988 | Cobs | 119/1 |
| 4,782,788 | 11/1988 | Arcand | 119/1 |
| 4,791,883 | 12/1988 | Lehman et al. | 119/1 |
| 4,807,564 | 2/1989 | Soberg et al. | 119/1 |
| 4,846,103 | 7/1989 | Brown | 119/1 |
| 4,890,576 | 1/1990 | James | 119/1 |

Primary Examiner—Paul J. Hirsch
Attorney, Agent, or Firm—Seidel, Gonda, Lavorgna & Monaco

[57] ABSTRACT

A collapsible disposable cat litter box comprises a collapsible closure means by which the used litter box can be sealed closed quickly for easy disposal. The box comprises a moisture-proof enclosure with collapsible closure means extending from the side walls of the enclosure. The collapsible closure means includes two rigid top panels and two foldable panels. The foldable panels are scored so that they may be pushed inward to close the top of the litter box quickly. The side panels also include a horizontal score line so that the upper portion of the side panels may be folded down to enhance the rigidity of the litter box.

6 Claims, 3 Drawing Sheets

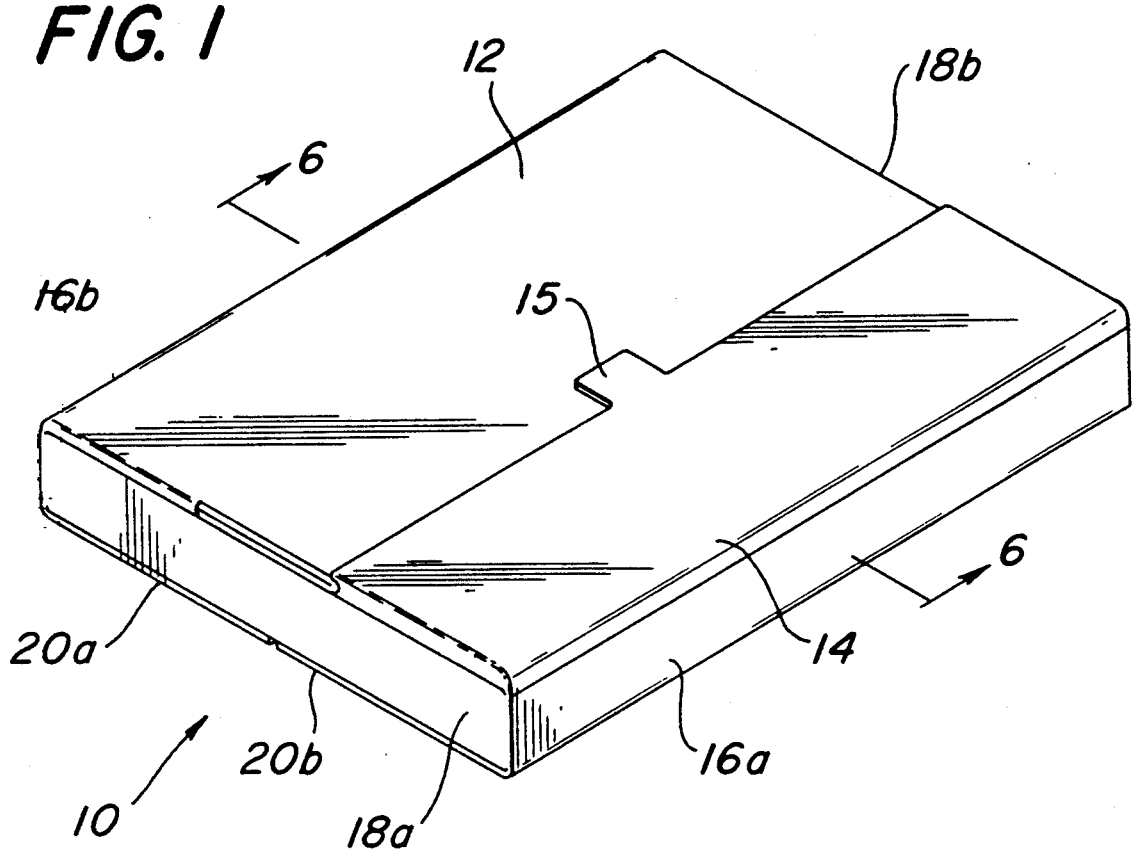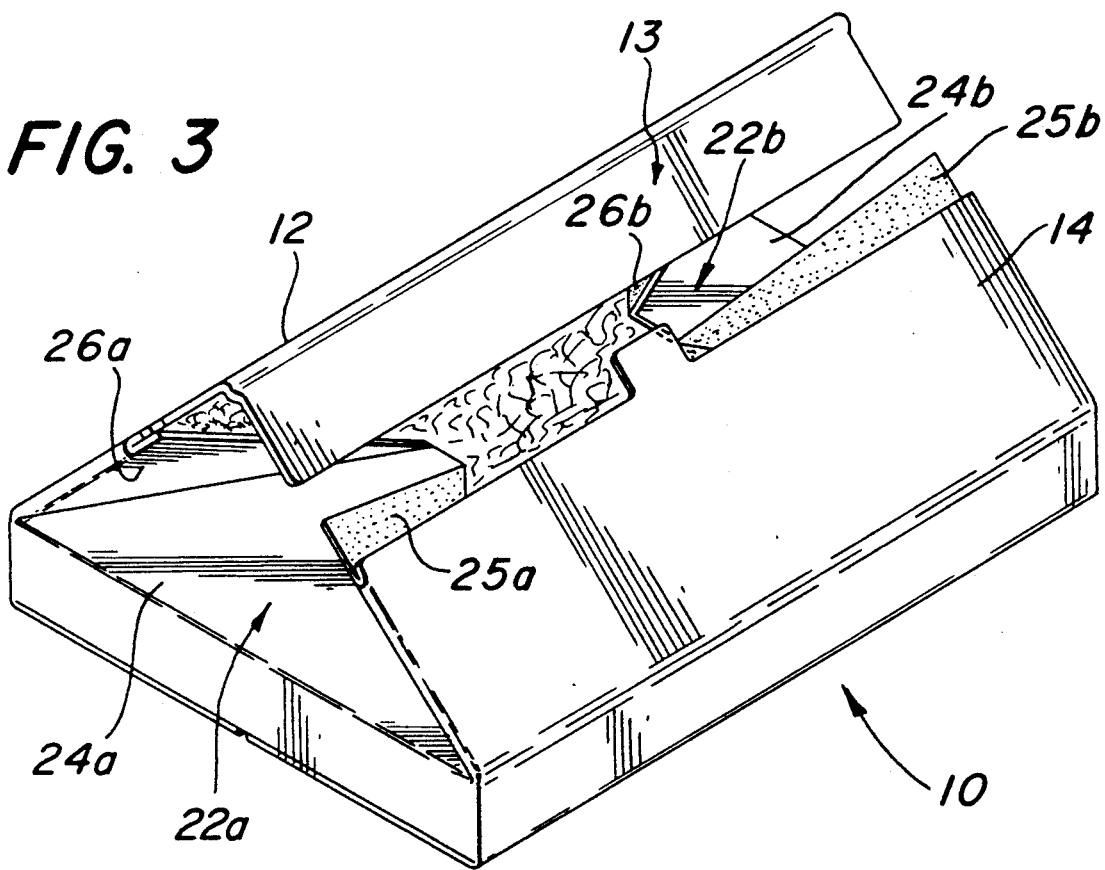

COLLAPSIBLE DISPOSABLE CAT LITTER BOX

FIELD OF THE INVENTION

This invention relates broadly to a reclosable, disposable box, and in particular to cat litter boxes, especially a cat litter box which is pre-filled with cat litter. The box serves as its own container for the cat litter and is reclosable and disposable when the cat litter is used up and must be thrown away.

BACKGROUND OF THE INVENTION

It is known to provide a cat litter box which acts as a container in which cat litter is sold, a commode for the cat, and a container for disposing the used cat litter in a sanitary manner. In order to carry out these three functions satisfactorily, such a cat litter box must be inexpensive to manufacture, impervious to moisture, and sufficiently durable so that the box will not be bent or torn when a cat climbs in or out of it. It is also preferable that such a cat litter box be collapsible to a closed position in which the box itself is of a convenient shape for stacking, carrying in the hands, or disposing in a trash can, while still being large enough when in an opened position to accommodate a typical-sized cat. Further, such a litter box should have side walls of a sufficient height so that a cat will be unable to spill cat litter from it. Also very important is the ability of the box to be easily collapsed securely and re-closed when it is full. The extent of even indirect contact with contaminated litter should generally be minimized. A person wanting to reclose the box when it is full of contaminated cat litter will be unwilling to put his hands very far inside the box in order to close it. It is thus desirable to prove a collapsible, disposable cat litter box which may be securely re-sealed as quickly and easily as possible.

U.S. Pat. No. 4,628,863 to Eichenauer discloses a disposable cat litter box in which a plurality of panels serve as both a wall around the litter box and, when folded down, a cover for the litter box. The end wall members in the upper portion of the litter box are creased with diagonal score lines. As shown in FIGS. 2 and 3 of the reference, the end wall members with the diagonal creases fold into generally triangular shapes at the top of the box when the box is in a closed position. In order to unfold the box into its open position, the triangles are first folded outward and then unfolded, as in FIG. 2 of the reference. All of the side panels further include a horizontal crease by which all of the panels are folded down to enhance the rigidity of the side walls. To unfold this horizontal crease so as to collapse the side panels down onto the litter, the human user must reach down into the litter box, placing his hands near the contaminated litter. To close the box, the user must reach in to push the triangular portions outward. Even this small exposure to the inside of the litter box is unsanitary.

It is an object of the present invention to provide a collapsible, disposable cat litter box which further minimizes the necessary contact with the area around the cat litter, which may be opened and closed relatively quickly, and which provides a degree of rigidity to prevent tearing and bending in use.

A further object of the present invention is to provide a collapsible, disposable cat litter box in which contaminated cat litter may be disposed in a sanitary manner without requiring twist ties, tape, or the like.

SUMMARY OF THE INVENTION

The present invention is a reclosable box, comprising a bottom panel; side walls extending upwardly from the bottom panel, so as to form an enclosure; and a collapsible closure means extending upwardly from the side walls. The collapsible closure means includes a first top panel extending from one of the side walls; a second top panel, extending from a side wall opposite the side wall from which the first top panel extends; and first and second foldable panels, extending from side walls between the first and second top panels. The first and second top panels and the first and second foldable panels together form an upward extension of the enclosure formed by the bottom panel and side walls. The first and second foldable panels have an arrangement of score lines dividing each foldable panel into a front wing, a central portion, and a rear wing. The score lines are adapted to constrain the first and second foldable panels to be folded substantially parallel to the bottom panel with the central portions of each of the side panels folding inward and beneath the front and rear wing portions. When the first and second top panel and the side panels are folded inward, the litter box is completely enclosed. The first and second foldable panels further include horizontal score lines dividing each foldable panel into an upper and lower portion. The horizontal score lines permit the upper portion of the first and second foldable panels to be folded over the remainder of the first and second foldable panels, thereby enhancing the rigidity of the collapsible closure means. A tongue extends from the first top panel and is so dimensioned as to be insertable into bellows corners formed between the second top panel and wings when the foldable panels and top panels are folded downward.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a perspective view of the cat litter box of the present invention in the folded position.

FIG. 3 is a perspective view of the cat litter box of the present invention, partially folded.

DETAILED DESCRIPTION OF THE INVENTION

Figure 2:
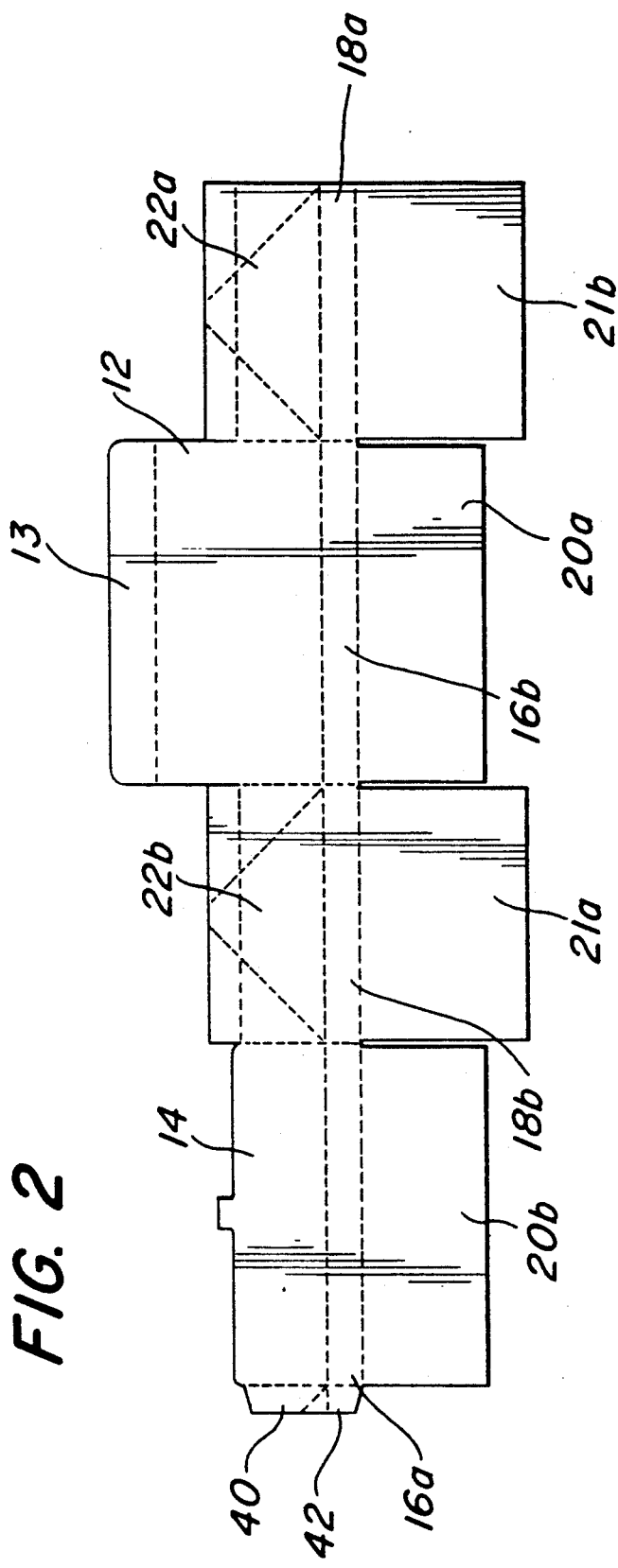
FIG. 2 is a plan view of a blank from which the cat litter box of the present invention may be made.

FIG. 1 shows the cat litter box 10 of the present invention in its closed position. Litter box 10 includes two top panels 12 and 14, side walls 16a, 16b, 18a and 18b, and a bottom panel, in the preferred embodiment created by an "all-flaps-meet" system, partially shown as flaps 20a and 20b in FIG. 1. Top panel 14 is secured to top panel 12 by a tab 15, which is preferably glued to top panel 12 by a suitable adhesive, such as a hot-melt glue. The cat litter box may be purchased with cat litter prepackaged therein, or purchased empty and filled with bulk cat litter by the consumer for purchasing economy. The outer surfaces of the litter box 10 may be decorated so that the litter box may serve as its own package. The litter box 10 may further be shrink-wrapped with transparent plastic or otherwise packaged for the convenience of the retailer and consumer.

The litter box 10 is preferably constructed from corrugated board, and may be assembled from a one piece blank, as shown in FIG. 2. The flat blank of FIG. 2 is cut to shape and provided with the necessary score lines in conformity with the design of the litter box which will be described in detail below.

Flaps 20a, 20b, 21a, and 21b form the bottom panel of the cat litter box 10 when the blank is folded together in a manner known in the art as a regular slotted carton with an "all-flaps-meet" bottom panel. Extending upwardly from the bottom panel is a plurality of side walls 16a, 16b, 18a and 18b. When the cat litter box 10 is in its closed position, as shown in FIG. 1, the top of the closed box comprises top panels 12 and 14. Flaps 40, 42 aid in holding the box together upon manufacture and maintaining a substantially continuous enclosure around the top panels and foldable side panels. The flaps 40 and 42 may be attached to the adjoining area of paperboard or corrugated board in the finished box by conventional means, such as glue, staples, or tape.

FIG. 3 shows the cat litter box 10 in a partially open position, showing the relationship between the top panels 12, 14 and the foldable side panels 22a and 22b. The side panels 22a, 22b and the top panels 12 and 14 form what is known in the art of carton manufacture as "bellows corners". The vertical edges of the side panels 22a, 22b are generally continuously attached to the vertical edges of top panel 12 and 14. Each top panel 22a and 22b is creased with score lines to form three sections, central sections 24a, 24b; front wings 25a, 25b; and rear wings 26a, 26b. The wings are generally triangular in shape with one edge forming the vertical edge of the side panel connected to the vertical edge of the adjacent top panel, while the central section of each side panel is of a generally triangular or trapezoidal shape. The score lines forming the creases between the sections in each side panel constrain the side panels to fold as shown in FIG. 3, where the central panels 24a and 24b fold inward towards the interior of the box 10, while the wings 25a, 25b, 26a, 26b are folded between the central portions 24a, 24b and the top panels when the box 10 is completely closed.

Extending from the top panel 12 is tongue 13. Tongue 13 is dimensioned to fit snugly in the inside bellows corners defined by top panel 14 and front wings 25a and 25b, as can be seen clearly in FIG. 3.

Figure 4:
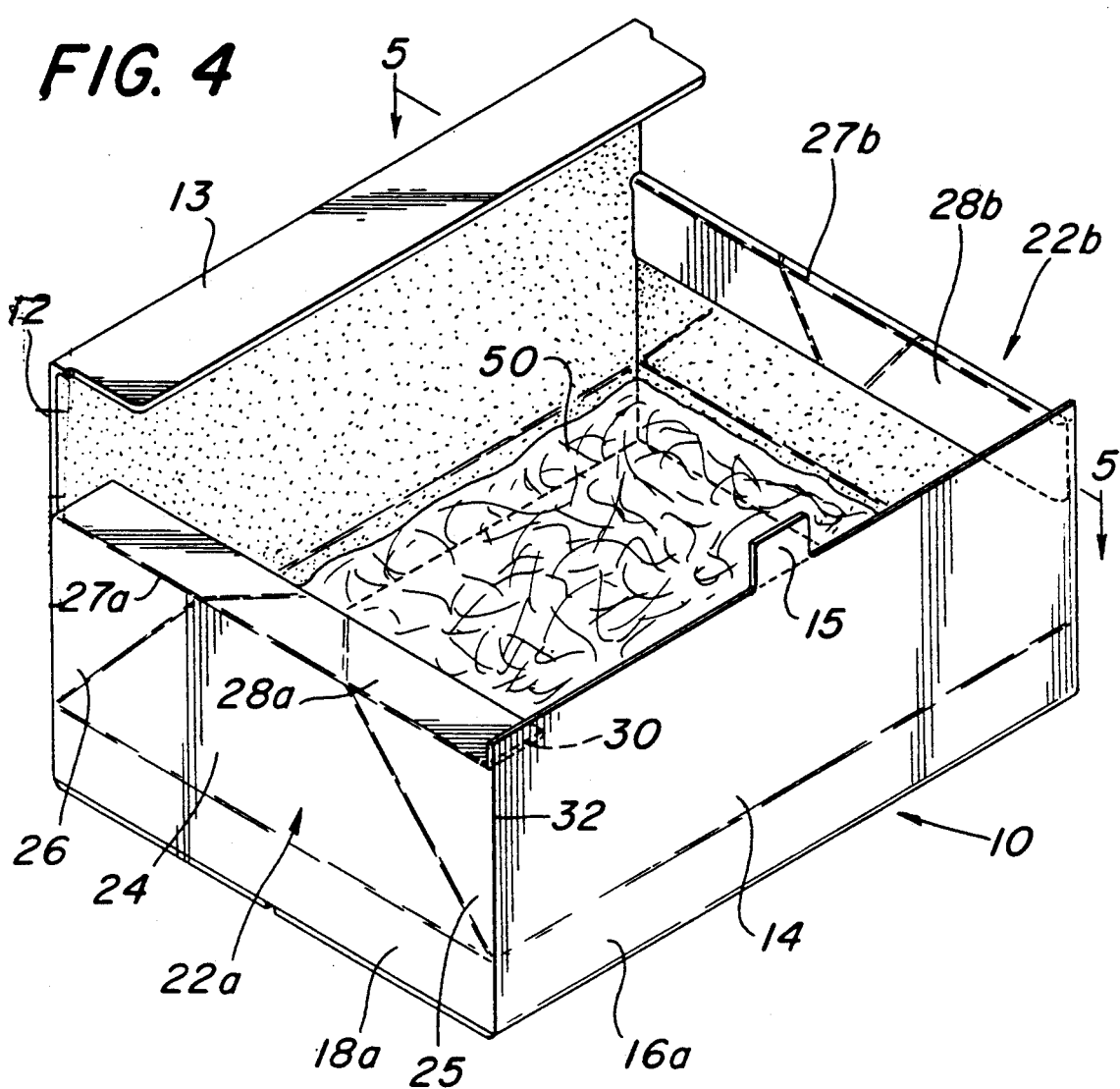
FIG. 4 is a perspective view of the litter box of the present invention, substantially completely open.

FIG. 4 shows the litter box 10 of the present invention in a substantially completely opened position. The litter box 10 is placed in the open position when used as a commode by a cat. The top panels 12 and 14 and the side panels 22a, 22b form a substantially continuous upward extension of the side walls 16a, 16b and 18a, 18b. This upward extension of the enclosure formed by the litter box 10 serves to enhance the sanitary properties of the litter box, in that cats tend to kick around the litter in the litter box when burying their feces. By providing relatively high barriers around the top level of the litter 50, the litter box will prevent contaminated litter from spilling onto the floor.

A significant problem with litter boxes, particularly of the disposable kind, is that disposable litter boxes are often made of paperboard or corrugated board, which can be bent or torn as the cat climbs over the sides of the litter box 10. Bends or tears in the sides of the litter box may easily cause leaks.

To enhance the rigidity of the sides of the litter box 10, the side panels 22a, 22b are further provided with horizontal creases 27a, 27b. These horizontal creases 27a, 27b are scored into the side panels in addition to the score lines used to define the wings 25a, 25b, 26a, 26b. The horizontal score lines 27a, 27b define an upper portion 28a, 28b for each of the side panels 22a, 22b. The upper portions 28a, 28b are proportioned relative to the remainder of the side panels so that, when the upper portions 28a, 28b are folded inward and downward, the top edge of the side panels 22a, 22b (which point downward when the upper portions 28a, 28b are folded over) is spaced a significant distance from the top level of the litter 50. In this way, a person wishing to close the litter box need not put his fingers near the contaminated litter. Also, the relatively small upper portions give the litter box sufficient height to prevent spilling of cat litter.

Figure 5:
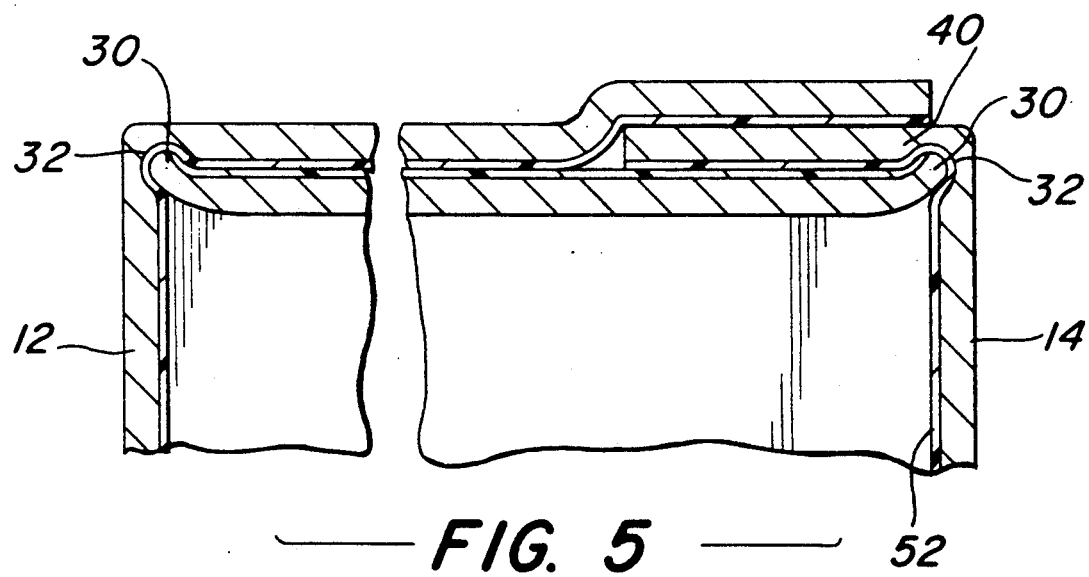
FIG. 5 is a cross-sectional view through line 5—5 of FIG. 4.

To hold upper portions 28a, 28b in place when folded over, the vertical edges of the upper portions 28a, 28b may be formed into positive radius curved edges 30, as shown in FIG. 5. When the upper portions 28a, 28b are folded downward against the side panels 22a, 22b as shown in FIG. 4, the convex edges 30 of the upper portion 28a, 28b fit into slit score lines 32 provided at the intersection of the side panels 22a, 22b with the top panels 12 and 14. If the box is made of corrugated board, the slit score lines can be formed by cutting through one layer of liner. Radiused edge 30 is received and securely held in slit score line 32. The positive radiused edges 30 maintain upper portions 28a, 28b in the desired downward position while adding a minimum of expense to the manufacture of the boxes. Other means for holding down the upper portions 28a, 28b can be used as well, such as forming distinct tabs in the vertical edges of the upper portions 28a, 28b, to be received by slots cut all the way through the corresponding portions of the side walls and top panels, or such as force fitting edges 30 into the corner fold at the intersection of side panels 22a, 22b. In the latter case, edges 30 need not be radiused, and, if desired, slit score lines 32 may be omitted. Upper portions 28a, 28b may be made slightly oversize to facilitate holding in the corner folds.

Figure 6:
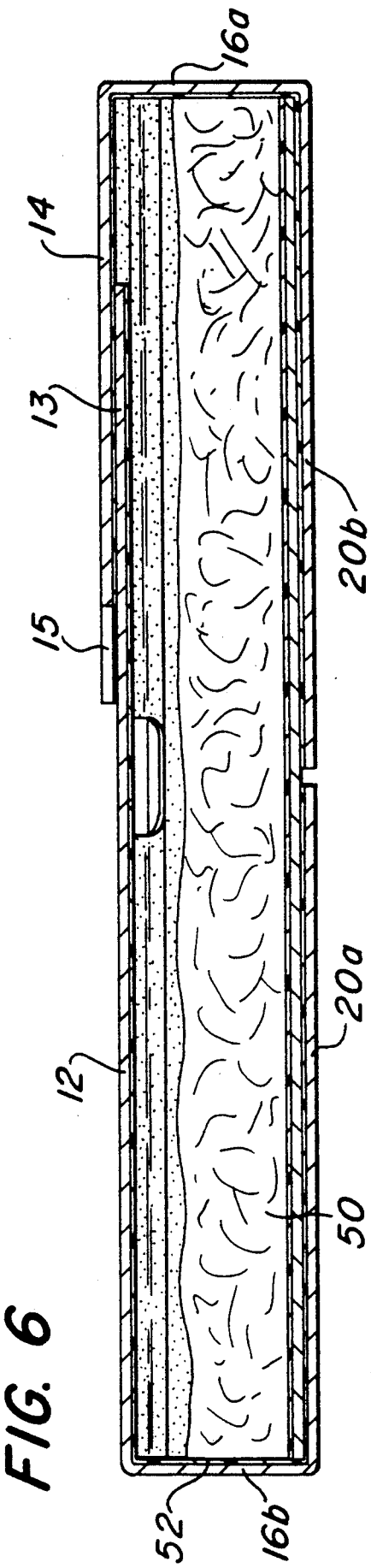
FIG. 6 is a cross-sectional view through line 6—6 of FIG. 1.

To close the box, the user first unfolds panels 28a, 28b upward to make the side panels 22a, 22b inwardly foldable as in FIG. 3, and then inserts the tongue 13 underneath top panel 14 as the top panels 12 and 14 close together. When the litter box is closed, as in FIG. 1 and in the cross-sectional view of FIG. 6, the tongue 13 serves to maintain the closure of the top panels 12 and 14 when the litter box 10 is being carried, and also prevents contaminated cat litter from spilling out of the box when the box is disposed in a trash receptacle.

The cat litter box of the present invention is preferably made moisture-proof by a moisture-proof coating 52 on the internal surface of the box. Alternatively, a plastic liner may be disposed inside the box 10 to prevent leakage of liquid through the box.

The present invention may be embodied in other specific forms without departing from the spirit or essential attributes thereof and, accordingly, reference should be made to the appended claims, rather than to the foregoing specification, as indicating the scope of the invention.

We claim:

1. A collapsible reclosable box, comprising:
   (a) a generally rectangular bottom panel;
   (b) a plurality of side walls extending upwardly from the edges of the bottom panel, the bottom panel and side walls forming an enclosure; and
   (c) collapsible closure means extending from the side walls, including:
      (i) a first top panel, extending from one of the side walls,
      (ii) a second top panel, extending from the opposite side wall,
      (iii) first and second foldable panels, extending from the side walls between the first and second top panels, and forming with the first and second top panels an upward extension of the side walls, the first and second foldable panels having score lines dividing each foldable panel into a front portion, a central portion, and a rear portion, the first and second foldable panels being substantially parallel to the bottom panel when folded, with the central portions folding inward on the enclosure, the first and second foldable panels further having score lines dividing each foldable panel into an upper and lower portion and constraining the upper portion of the first and second foldable panels to fold downward on and overlap the lower portion of the first and second foldable panels, said upper portions extending substantially the entire width of said foldable panels and being in contact at respective ends with the adjacent side wall, thereby enhancing the rigidity of the collapsible closure means, and
      (iv) a tongue of substantially the same width as the first top panel and extending therefrom for a sufficient distance to make the first top panel substantially longer than the second top panel, and so dimensioned as to be insertable in the space formed between the second top panel and the foldable panels when the collapsible closure means is folded to form a complete closure.

2. A box as in claim 1, further including means for providing a moisture-proof enclosure around the interior of the litter box.

3. A box as in claim 1, further comprising means for securing the folds of the upper portions of the side panels on the lower portions, the means including positive-radius edges on the vertical edges of the upper portions and slits defined in the corners formed by the side panels and top panels, whereby the positive radius edges lodge in the slits when the upper portions of the side panels are folded downward.

4. A box as in claim 1, further comprising means for frictionally securing the edges of the first and second foldable panels between respective adjacent side walls.

5. A collapsible reclosable box, comprising:
   (a) a generally rectangular bottom panel;
   (b) a plurality of side walls extending upwardly from the edges of the bottom panel, the bottom panel and side walls forming an enclosure;
   (c) collapsible closure means extending from the side walls, including:
      (i) a first top panel, extending from one of the side walls,
      (ii) a second top panel, extending from the opposite side wall,
      (iii) first and second foldable panels, extending from the side walls between the first and second top panels, and forming with the first and second top panels an upward extension of the side walls, the first and second foldable panels having score lines dividing each foldable panel into a front portion, a central portion, and a rear portion, the first and second foldable panels being substantially parallel to the bottom panel when folded, with the central portions folding inward on the enclosure, the first and second foldable panels further having score lines dividing each foldable panel into an upper and lower portion and constraining the upper portion of the first and second foldable panels to fold downward on the lower portion of the first and second foldable panels, said upper portions extending substantially the entire width of said foldable panels and being in contact at respective ends with the adjacent side wall, thereby enhancing the rigidity of the collapsible closure means, and
      (iv) a tongue of substantially the same width as the first top panel and extending therefrom for a sufficient distance to make the first top panel substantially longer than the second top panel, and so dimensioned as to be insertable in the space formed between the second top panel and the foldable panels when the collapsible closure means is folded to form a complete closure; and
   (d) means for frictionally securing the edges of the first and second foldable panels between respective adjacent side walls.

6. A collapsible reclosable cat litter box, comprising:
   (a) a generally rectangular bottom panel;
   (b) a plurality of side walls extending upwardly from the edges of the bottom panel, the bottom panel and side walls forming an enclosure for containing a quantity of cat litter;
   (c) at least an opposing pair of the side walls being of a height low enough to permit easy ingress and egress of a cat, said walls being characterized by an absence of cut-away portions for ingress and egress;
   (d) collapsible closure means extending from the side walls, including:
      (i) a first top panel, extending from one of the side walls,
      (ii) a second top panel, extending from the opposite side wall,
      (iii) first and second foldable panels, extending from the side walls between the first and second top panels and forming with the first and second top panels an upward extension of the side walls, the first and second foldable panels having score lines dividing each foldable panel into a front portion, a central portion, and a rear portion, the first and second foldable panels being substantially parallel to the bottom panel when folded, with the central portions folding inward on the enclosure, the first and second foldable panels further having score lines dividing each foldable panel into an upper and lower portion and constraining the upper portion of the first and second foldable panels to fold downward on the lower portion of the first and second foldable panels, said upper portions extending substantially the entire width of said foldable panels and being in contact at respective ends with the adjacent side wall, thereby enhancing the rigidity of the collapsible closure means, and (iv) a tongue of substantially the same width as the first top panel and extending therefrom for a sufficient distance to make the first top panel substantially longer than the second top panel, and so dimensioned as to be insertable in the space formed between the second top panel and the foldable panels when the collapsible closure means is folded to form a complete closure; and (e) means for frictionally securing the edges of the first and second foldable panels between respective adjacent side walls.

* * * * *